United States Patent [19]
Tanaka

[11] 3,906,394
[45] Sept. 16, 1975

[54] APPARATUS FOR REGULATING DISTANCE BETWEEN REFLECTION MIRRORS OF LASER RESONATOR

[75] Inventor: Keiichi Tanaka, Kiyose, Japan

[73] Assignee: Agency of Industrial Science & Technology, Tokyo, Japan

[22] Filed: Mar. 6, 1974

[21] Appl. No.: 448,544

[30] Foreign Application Priority Data
Mar. 14, 1973 Japan.............................. 48-29029

[52] U.S. Cl............................. 331/94.5 C; 350/271
[51] Int. Cl............................................... H01s 3/08
[58] Field of Search ........... 331/94.5; 350/289, 271; 356/106

[56] References Cited
UNITED STATES PATENTS
3,753,150   8/1973   Zar .................................... 331/94.5

*Primary Examiner*—William L. Sikes
*Attorney, Agent, or Firm*—Oblon, Fisher, Spivak, McClelland & Maier

[57] ABSTRACT

The distance between reflection mirrors of a laser resonator is finely regulated over a wide range by driving a servo-motor upon an error signal produced due to a variation of frequency of a laser beam, converting the rotational movement of the servomotor to a linear movement by using a rotation screw means, converting the linear movement to a linear fine movement by using a lever means and transmitting the linear fine movement to one of the reflection mirrors by using a spring means which exerts a linear force on the one mirror upon the linear fine movement.

4 Claims, 4 Drawing Figures

PATENTED SEP 16 1975   3,906,394

APPARATUS FOR REGULATING DISTANCE BETWEEN REFLECTION MIRRORS OF LASER RESONATOR

BACKGROUND OF THE INVENTION

The present invention relates to a regulation apparatus for finely regulating the distance between reflection mirrors of a laser resonator by means of a pure mechanical arrangement.

In making precise scientific measurements, there has been used, for example, the He-Ne laser, which has a stable operating frequency and which utilizes spacers to support the reflection mirrors of the resonator and to maintain the distance between the mirrors. However, it has been known that the effective distance between the mirrors of such laser are susceptible to variation upon the thermal expansion of the spacers due to heat generation of the laser itself and upon the possible variation of the refraction coefficiency of the ambient air due to changes of atmospheric pressure and/or turbulence, resulting in a variation of the frequency of the output laser beam.

In order to overcome this problem and to attain automatic stabilization of laser output frequency, it has been usual to detect a laser output frequency variation, convert it to an error signal and finely regulate the distance between the reflection mirrors which constitute the laser resonator by using the error signal.

In a typical method of performing the fine regulation of the distance between the reflection mirrors, one of the reflection mirrors is supported by a piezo-electric element of, for example, barium titanate which is deformed by application of the error signal voltage, so that the position of the mirror is varied according to the deformation of the piezo-electric element. However, the expansion coefficient of known piezo-electric elements is about $0.4 \times 10^{-4}$ $\mu$m/V at most. In addition to this, since the usual piezo-electric element is composed of a circular plate of piezo-electric material having a thickness in a range of 1 to 3 mm with a pair of metal electrodes vapor-deposited on the opposite surfaces thereof across which a high voltage is applied, the voltage which can permissibly be applied thereacross is limited to about 2KV in most cases.

That is, the maximum expansion of about 0.4 $\mu$m of a single piezo-electric element corresponds to an output frequency variation range of about 700 MHz for a He-Ne laser having a resonator as long as 30 cm and this range is only about one half to about one third of the full frequency range within which the laser oscillation is obtainable. With such a narrow range, it is impossible to obtain sufficient distance regulation. Therefore, it is usual to employ a plurality of piezo-electric elements in such a manner that, for example, ten piezo-electric elements are stacked and each is bonded to its neighbor by an electrically conductive adhesive to form a series connected stack and a plurality of stacks are connected electrically in parallel with each other to form a piezo-electric element assembly, to thereby increase the effective expansion of the piezo-electric element caused by application of the signal voltage thereto.

In this case, however, the maximum expansion amount of known piezo-electric elements for the maximum permitted voltage is still only about 8 $\mu$m and further irregular movement of the mirror including inclination with respect to the optical axis thereof occurs because of the hysterisis deformation inherent in the piezo-electric elements constituting the assembly and/or the local variation in the expansion thereof. In addition to these disadvantages, since the noise produced in an electric power supply is amplified as mechanical noise of the piezo-electric element, variation of laser output occurs.

Particularly, in this case, since there is a considerable variation in characteristics of the resultant piezo-electric element assembly due to the variations in the properties of the adhesive and in the bonding procedures, the piezo-electric element assembly is not reliable for fine regulation purposes.

Another method of the conventional distance regulation methods is to support one of the reflection mirrors by a moving coil, to support the moving coil by a resilient structure and to move the coil upon an electro-magnetic force. In this case, however, a magnetic flux leakage from the coil will affect the properties of the laser inversely.

Therefore, a primary object of the present invention is to provide an inter-mirror distance regulation apparatus for regulating the distance between the reflection mirrors of a laser resonator which utilizes a pure mechanical arrangement and makes fine regulation of the distance possible for a full frequency range within which a laser oscillation can be obtained.

Another object of the present invention is to provide an inter-mirror distance regulation apparatus for regulating the distance between the reflection mirrors, which is free from mechanical noise and magnetic problems and can move one of the reflection mirrors completely in parallel with the other mirror.

SUMMARY OF THE INVENTION

In order to achieve the above described objects of the present invention, the present apparatus comprises a servo-motor driven by an error signal obtainable from a possible frequency variation of laser beam, a rotational screw means for converting the rotational movement of the servo-motor to a linear movement, a lever means for reducing the linear movement to be given by the rotational screw means to a fine linear movement and a spring means for transmitting the fine linear movement to be given by the lever means to one of the reflection mirrors.

Since the present apparatus is constituted purely mechanically, it is possible to set arbitrarily the distance to be finely controlled and since it does not use any electrical and/or magnetical element directly, these elements do not affect the laser performance and a stable fine regulation becomes possible.

Other objects and features of the present invention will become apparent from the detailed explanation of an embodiment of the present invention with reference to the attached drawings which are as follows.

DETAILED EXPLANATION OF THE INVENTION

Figure 1:
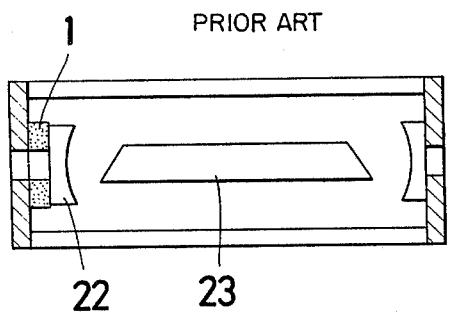
FIG. 1 is a cross-sectional view of a conventional laser resonator using a piezo-electric element.

FIG. 1 shows an example of the conventional laser resonators in which one (22) of the reflection mirrors is shown as supported at one end of the optical axis thereof by an annular piezo-electric element 1, the distance between the reflection mirror 22 and the other reflection mirror being regulated finely by applying an electric voltage to the piezo-electric element, as mentioned previously. In this example, however, the range within which fine regulation is possible is narrow and it is impossible to provide a complete parallel movement of the mirror 22 with respect to the other mirror as mentioned previously.

Figure 2:
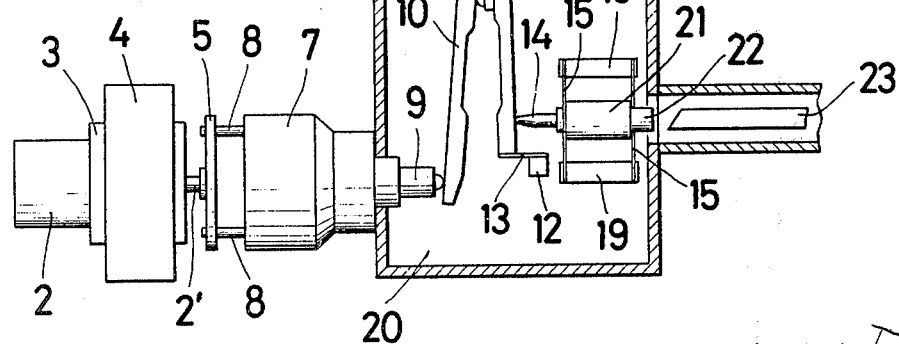
FIG. 2 is a partial cross-sectional view of a laser resonator to which an embodiment of the present invention is applied.
Figure 4:
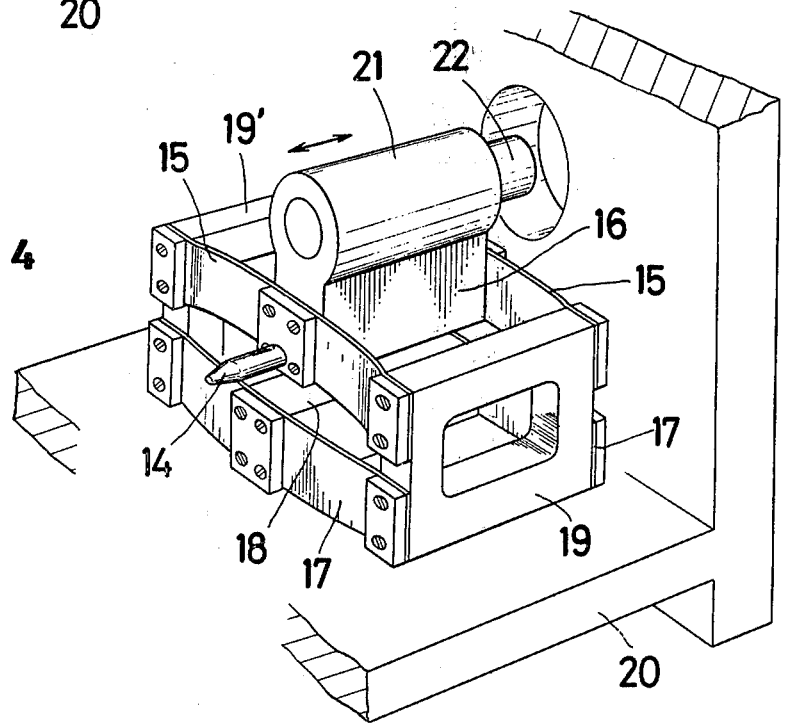
FIG. 4 is a perspective view of a rotational screw means suitable for use in the present regulation apparatus.

Turning to FIG. 2 which shows an embodiment of the present invention where it is applied to a laser resonator similar to that shown in FIG. 1, a servo-motor 2 to be driven by an error signal obtainable from a frequency variation of the laser beam is combined with a reduction gear mechanism 3 and the gravity center of the combined mechanism is supported by a gimbal mechanism 4 disposed on a suitable base structure.

Figure 3:
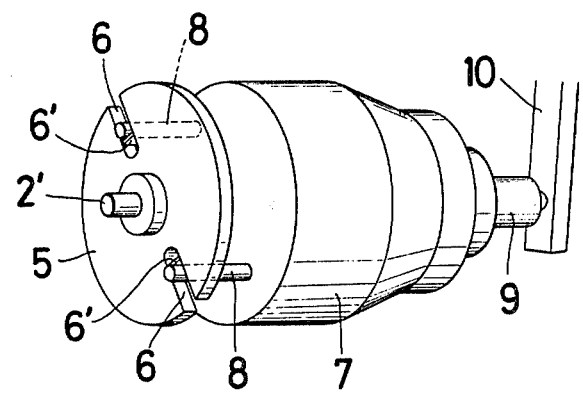
FIG. 3 is a perspective view of a balance type parallel spring means suitable for use in the present regulation apparatus.

The rotational speed of the servo-motor 2 is reduced by the reduction gear mechanism 3 which has an output shaft 2'. A circular plate 5 is fixedly mounted on the output shaft 2'. The circular plate 5 is provided with a pair of slot-like notches 6 in the periphery thereof into which pins 8 extending from a rear end of a head 7 of a rotational screw are inserted respectively. A spring 6' is provided in a closed end of each of the notches 6 to provide a soft supporting force to the pin 8 therein which urges it outwardly, to thereby support the pin 8 softly so that only the rotational movement of the servo-motor 2 is transmitted to the screw while presenting any mechanical vibrations of the servo-motor from being transmitted to the screw and so that according to the rotation of the circular plate 5 the rotational screw head is smoothly shifted in directions along its rotation axis without hindering the rotation thereof (FIG. 3).

The rotational screw mentioned above is composed of the head 7 and an associated spindle 9. The spindle 9 is shiftable along its rotational axis according to the rotation of the head 7. In this case, when a scale is provided on a side surface of the screw head to detect the rotational amount thereof, the amount of the linear shift of the spindle can easily be detected. A top of the spindle is in contact with a free end of a first lever 10, the fulcrum of which is supported by a pair of miniature bearings fixedly provided in a support frame structure.

A lower end of a second lever 11 is connected with one end of a flat spring 13 and the other end of the flat spring 13 is fixedly supported by a support block 12 which is in turn fixedly supported by the support frame structure. Therefore the flat spring 13 itself is used as a distributed fulcrum of the second lever 11. The free end of the second lever 11 is made in contact with the first lever at a point near the fulcrum of the latter. At a point on the second lever 11 near the fulcrum thereof, a pin 14 is in contact with the lever 11. The pin 14 extends from a balance type parallel flat spring assembly.

The spring assembly is constituted with a pair of upper flat springs 15 and a pair of lower flat springs 17.

The opposite ends of each of the springs 15 and 17 are supported by support blocks 19 and 19' respectively to form a parallel spring arrangement. The support blocks are movable along the surface of a base plate 20 which is fixedly mounted on the frame structure. The upper and lower flat springs 15 and 17 are disposed in parallel with each other in this manner. A central movable block 15 connects the flat springs 15 at the centers thereof. A block 18 is provided to connect the lower flat springs 17 at the centers thereof. The block 18 connecting the lower flat springs 17 is fixed to the base plate 20.

The pin 14 which is in contact with the second lever 11 is mounted on the rear flat spring 15 and extends rearwardly therefrom. On the upper movable block 16, a reflection mirror holder 21 is mounted. At the forward end of the mirror holder 21, a reflection mirror 22 is mounted so that the mirror surface thereof faces a laser tube 23.

In operation of the inter-mirror distance regulator constructed in this manner, an error signal is produced by a suitable means from the frequency variation of the laser beam. The electric signal is used to supply a driving power to the servo-motor 2 to rotate the same. The rotation of the servo-motor 2 is reduced by the reduction gear mechanism 3, the reduction ratio being, for example, 1/3000. Therefore the circular plate 5 mounted on the output shaft 2' of the reduction gear mechanism 3 is rotated at the reduced speed.

Since the pins 8 planted in the screw head 7 are inserted into the slot-like notches 6 of the circular plate 5, the screw head 7 is rotated with the rotation of the circular plate 5.

As mentioned previously, since the servo-motor and the reduction gear mechanism are combined as a unit and the gravity center of the unit is in the base of the gimbal mechanism 4, the output shaft of the unit, i.e., the output shaft 2' is always held in a constant direction and since the rotation of the servo-motor is indirectly transmitted to the screw head through the combination of the circular plate 5 and the pins 8 inserted into the notches 6 of the plate 5, the rotation is transmitted to the screw head while any vibrations of the servo-motor are prevented from being transmitted to the head.

The spindle 9 moves linearly along the rotation axis thereof upon the rotation of the rotatable screw head 7, to thereby swing the first lever 10 which is in contact with the top of the spindle 9.

As an example, when the free end of the first lever is pushed forward by the spindle, the free end of the second lever 11 which is in contact with the first lever 10 at a position between the fulcrum and the free end of the first lever 11 moves by a shorter distance in the horizontal direction than that of the free end of the first lever 10 and the movement of the free end of the second lever is transmitted to the pin 14 afixed to one of the upper parallel springs to move the pin by a further reduced distance, because the pin 14 is in contact with the second lever 11 at a position between the distributed fulcrum and the free end thereof.

The force transmitted in this manner to the pin 14 is exerted on the parallel spring 15 in which the pin 14 is planted. Therefore, the upper parallel springs 15 which are interconnected by the central movable block 16 are bent forward against the resiliencies thereof and simultaneously the lower parallel springs 17 of the balance type parallel spring assembly which are interconnected by the connecting block 18 fixed on the base plate 20 are bent rearward so that the balance of the assembly is maintained. Accordingly, the reflection mirror 22 mounted on the reflection mirror holder 21 can be moved in parallel with respect to the other mirror without providing any vertical and/or horizontal deviations to the mirror 22 and without vibrating the optical axis of the reflection mirror.

As will be apparent from the foregoing, the inter-mirror distance regulator for a laser resonator constructed in accordance with the present invention has a pure mechanical construction and can provide a fine regulation of the distance between the reflection mirror for a wide range. That is, for a laser embodying the present regulation apparatus, it is possible to maintain a stable laser oscillation within a variation range of, for example, 200 $\mu$m and it is possible to perform a fine regulation of 2 m$\mu$ at the minimum.

Accordingly, the present invention can be applied to, for example, a precisely stabilized laser using the saturation-absorption curve of iodine to record the absorption lines (light frequency band is on the order of 1 MHz) clearly and separately.

In addition to this, according to the present invention, since the servo-motor is supported by the gimbal mechanism, the disassembly thereof from the rotational screw side is easy and the alignment of the shafts of the motor and the screw in assembly thereof is also easy to perform. This is convenient for the transportation of the apparatus in the actual use.

Although in this embodiment a balance type parallel flat spring assembly is used to shift a mirror such as a concave mirror in parallel with the other mirror without providing any deviation of the optical axis thereof, a single flat spring having a relatively simple construction can be used for plane mirrors because in such case there is no need to shift one of them while severely maintaining the alignment of the optical axis thereof.

Furthermore, although in this embodiment two levers are used to gradually reduce the linear movement, it should be understood that this construction does not constitute a difinition of the present invention and the number of the levers can be increased or decreased to provide different reduction ratios and hence different fine regulations.

What is claimed is:

1. An apparatus for regulating distance between reflection mirrors of a laser resonator, comprising in combination, a rotational means driven by an error signal obtainable from a frequency variation of laser beam, means for converting the rotational movement of said rotational means to a linear movement, means for reducing the linear movement of said converting means to a fine linear movement and means for transmitting the fine linear movement to one of said mirrors.

2. An apparatus as set forth in claim 1, wherein said rotational means is a servo-motor, said converting means is a rotational screw, said reducing means comprises at least one lever means and said transmitting means comprises a balance type spring device.

3. An apparatus as set forth in claim 2, wherein the transmission of the rotational movement of said servo-motor to said screw is performed through a circular plate fixedly mounted on the output shaft of said servo-motor and provided with notches on the periphery thereof and pins planted in said screw and inserted into said notches.

4. An apparatus as set forth in claim 2, wherein said servo-motor is supported by a gimbal mechanism.

* * * * *